Figures 4, 5:
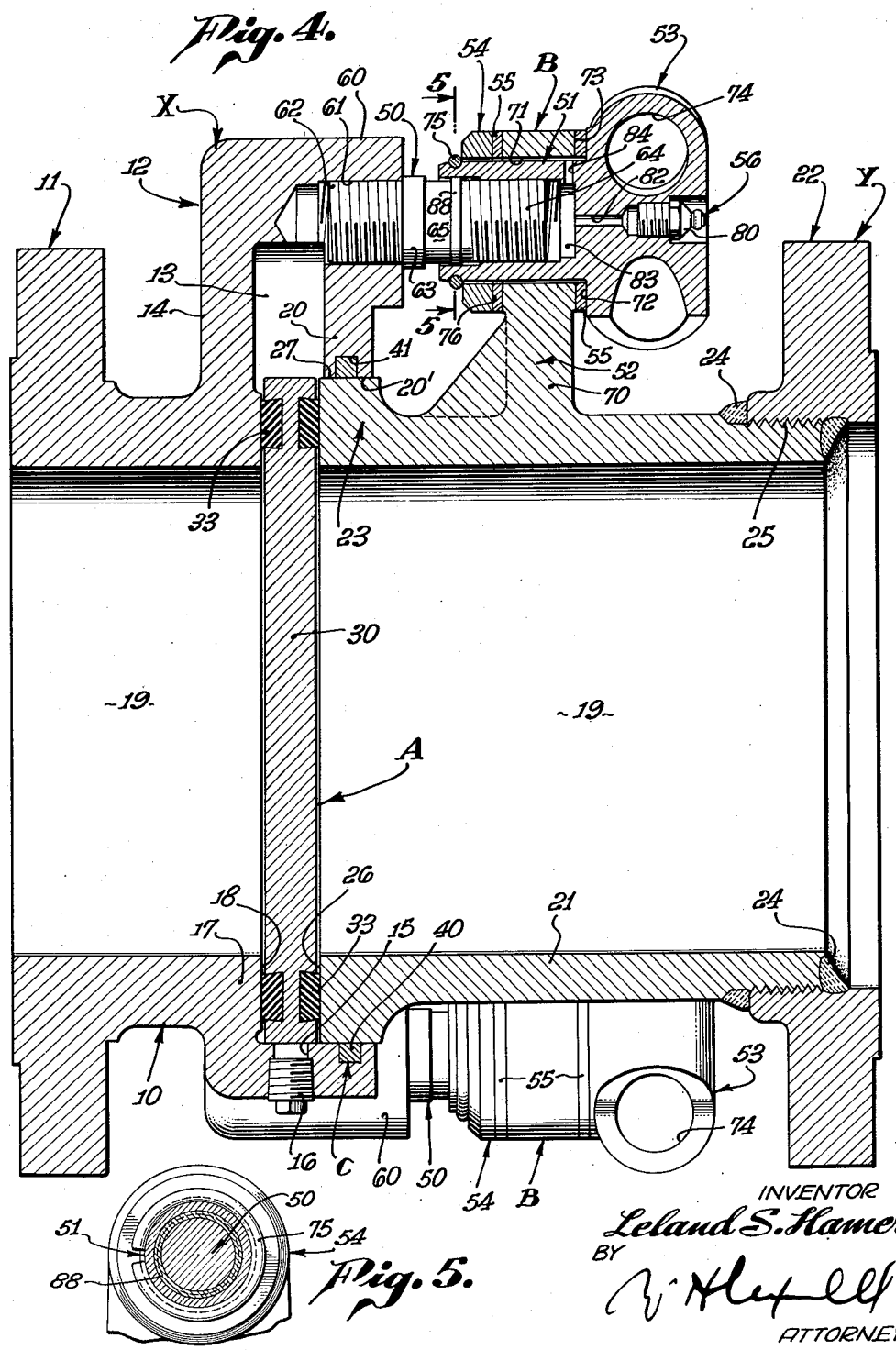

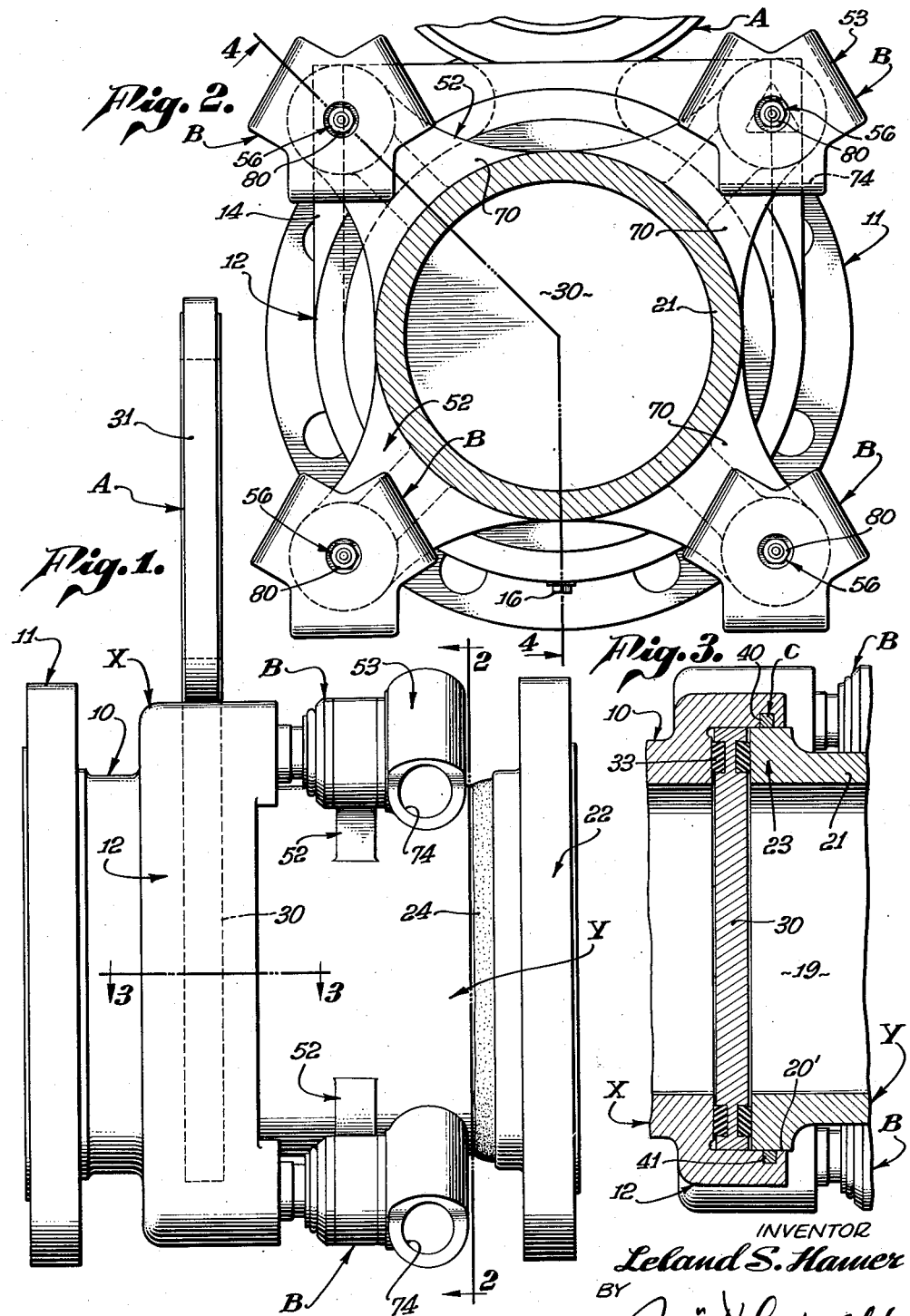

Patented Oct. 9, 1951

2,570,545

UNITED STATES PATENT OFFICE 2,570,545

PIPE JOINT

Leland S. Hamer, Long Beach, Calif., assignor of one-fourth to Paul A. Dewhirst, Los Angeles, Calif.

Application October 16, 1946, Serial No. 703,511

6 Claims. (Cl. 285—130)

This invention relates to a pipe line blinding fitting and it is a general object of the invention to provide an efficient, effective and improved fitting of this character.

It is a general object of the present invention to provide a line blinding fitting involving two telescoping sections and an improved, simple and practical means operable to connect the sections and to actuate them relative to each other to clamp a blinding plate in place or to release the plate for removal. With the construction of the present invention the relatively movable telescoping sections can be easily and conveniently operated so that they effectively clamp the blinding plate in operating position and they can likewise be easily and conveniently operated to release or free a blinding plate after it has been in service.

Another object of the present invention is to provide a fitting of the general character referred to which involves few simple easily formed parts, making the structure practical and inexpensive of manufacture.

It is a further object of the invention to provide a pipe line fitting of the character referred to which is simple and compact so that it takes up a minimum of space lengthwise of the pipe line and also projects a minimum amount laterally of the pipe line. The device of the present invention being compact both axially and laterally is suitable for use in many situations where ordinary blinding devices cannot be used since there are many situations where space is limited and does not permit the use of cumbersome or complicated devices.

The various objects and features of my invention may be fully understood from the following detailed description of a typical preferred form and application of the invention, throughout which description reference is made to the accompanying drawings, in which:

Fig. 1 is a side elevation of the fitting provided by the present invention showing a blinding plate in position therein. Fig. 2 is and end view of the structure that I have provided being a sectional view taken as indicated by line 2—2 on Fig. 1. Fig. 3 is a detailed plan section taken as indicated by line 3—3 on Fig. 1. Fig. 4 is an enlarged longitudinal sectional view of the structure, being a view taken as indicated by line 4—4 on Fig. 2, and Fig. 5 is a transverse sectional view taken as indicated by line 5—5 on Fig. 4.

The fitting of the present invention is intended primarily for use in pipe lines or in connection with manifolds or other like parts or devices, and it involves, generally, two flow conducting sections, an outer section X and an inner section Y, sealing means C between the sections, a plate A to be carried by or between the sections and coupling means joining or connecting the sections X and Y and operable to shift them axially relative to each other. The coupling means involves a plurality of like circumferentially spaced threaded connections B.

The sections X and Y of the fitting are tubular parts arranged coaxially and together forming a fluid conduit for conducting flow from one pipe section to another. The outer section X includes, generally, a tubular body 10, coupling means 11 at the outer end of the body for making connection with a pipe or the like, and a plate carrier 12 at the inner end of the body accommodating the plate A and receiving the inner end of section Y. The means 11 may be varied depending upon the type of connection to be employed in joining the fitting to a pipe or the like. In the drawings I have shown the means 11 as a simple flange formed integrally on the body 10 so that a pipe can be connected to the section X through a simple bolted flange connection.

The plate carrier is located at the inner end portion of the body 10 and is preferably an enlargement formed integrally with the body and in the nature of a bearing. The plate carrier 12 is formed to establish a chamber in the section X for the reception of the plate A and it has a laterally extending access opening 13 through which the desired plate portion or plate end can be passed to and from the chamber. In the preferred form of the invention the plate carrier 12 is curved and is concentric with the body 10 except at the top or upper side of the fitting where it has a vertically extending portion 14 through which the passage 13 extends. By thus forming the plate carrier fluid standing in the fitting will not spill or be allowed to escape therefrom when the fitting is operated in the course of introducing or removing a plate. A suitable drain opening 15 is provided in the bottom of the plate carrier and is normally closed by a suitable plug 16.

The wall 17 of the plate carrier, which is formed integral with the body 10 and may be considered a part thereof, has a seat 18 formed thereon in the chamber that receives the plate A, which seat is annular in form and surrounds the flow passage 19 extending through the section X and is disposed in a plane normal to the axis of the fitting. The flow passage 19 through the fitting X is preferably a round opening or passage extending continuously through the several parts of the fitting, that is, through the flange 11, body 10 and plate carrier 12 as clearly shown in Fig. 4 of the drawings.

The other or outer wall 20 of the plate carrier is provided with a bore 20' which is somewhat larger in diameter than the flow passage 19 and which is concentric with the flow passage 19. The bore 20' is provided to receive the inner end of the fitting section Y.

The inner section Y involves a simple tubular body portion 21, coupling means 22 at the outer end of the body 10, and a plate clamping portion 23 at its inner end. The means 22, like the means 11, may vary widely in character. In the case illustrated it is in the form of a simple flange provided on the outer end of body 21. The flange of means 22 is shown as a part formed separate from the body 21 and is suitably joined thereto. I have shown two means joining the body and flange, one threads at 25 and the other welding at 24. It will be understood that either one or both of these means may be employed as circumstances require.

The clamp portion 23 provided at the inner end of the body 21 is preferably integral with the body and, as shown in the drawings, it may be a simple enlargement on the inner end of the body finished to have a seat 26 opposing the seat 18 and a turned exterior 27 fitting the bore 20'.

The plate A may be any suitable line blinding or flow controlling plate. In the drawings I have shown the plate A as a double ended plate in which case it has a solid end 30 insertable in the chamber of the carrier 12 to fit between the seats 18 and 26, and it has an apertured end 31 which may be arranged in the chamber between the seats 18 and 26. In practice it is desirable to provide a seal between a plate portion or section engaged between the seats of the sections X and Y. In the drawings I have shown sealing rings 33 mounted in opposite sides of the plate ends to engage and seal with the seats of the body sections.

The sealing means C acting between the sections X and Y to prevent leakage from between the sections preferably includes a sealing ring 40 carried in one section to engage and seal with the other section. In the drawings the ring 40 is shown carried in a channel or groove 41 provided in the bore 20' so that the packing ring 40 engages and seals with the finished exterior 27 of the clamp portion 23.

The threaded connections B which are preferably alike may be varied in number and spacing, although it is preferred and has been found practical to employ four such connections and to space them 90° apart around the axis of the fitting, as clearly shown in Fig. 2 of the drawings. Each threaded connection B involves a threaded stud 50 projecting axially from one section of the fitting, preferably the outer section X, a sleeve 51 threaded onto the stud, a mounting bracket 52 on the other section of the fitting and holding the sleeve, a head 53 on the outer end of the sleeve, a collar 54 on the inner end of the sleeve, thrust washers 55 adjacent the head and collar and means 56 for lubricating the working parts.

The stud 50 is carried by section X to project axially therefrom in the direction of section Y and in accordance with my present construction the stud projects from the outer side of wall 20 of the plate carrier 12. The wall 20 of the plate carrier is suitably enlarged at 60 where the stud is located and the enlargement 60 has a tapped opening 61 into which the inner end portion 62 of the stud is tightly threaded. I may provide the stud with a flange 63 to be seated against the outer face of enlargement 60.

The sleeve 51 has a running fit on the threaded outer end portion 64 of the stud and it has an unthreaded extension 65 at its inner end freely surrounding the stud.

The mounting bracket 52 is a projection extending laterally from the body 21 of section Y at a point intermediate the ends of the body and, as shown in the drawings, it may be an integral projection or lug on the body braced or stiffened by a suitable web 70. In accordance with my invention the bracket 52 has a bore or passage 71 formed therethrough concentric with the stud 50 and freely passing the sleeve 51.

The head 53 is in the nature of an enlargement on the outer end of the sleeve 51 and closes the outer end of the sleeve, and, as clearly shown in Fig. 4 of the drawings, has a shoulder 72 opposed to the outer side 73 of the mounting bracket and it is formed so that it can be readily engaged by a suitable operating tool. In the case illustrated the head is formed with a plurality of openings 74 suitable for the reception of bars, or the like.

The collar 54 fits around the inner end portion or extension 65 of the sleeve 51 on which part it is held or retained by a retainer ring 75. The retainer ring may be a simple, snap ring, as illustrated in Fig. 5 of the drawings. The collar 54 has an end or shoulder 76 facing the inner side of the mounting bracket 52.

The thrust washers 55 are carried on or surround the sleeve 51 and are arranged between the shoulder 72 and the outer side of bracket 52 and the shoulder 76 and the inner side of bracket 52 and serve as bearing members between these parts.

The means 56 provided for lubricating the working parts may involve a suitable grease connection 80 carried by the head 53 in communication with a port 82 communicating with a chamber 83 formed within the sleeve 51 between the end of the stud 50 and the head 53. Lubricant introduced into the chamber 83 effectively lubricates the threaded connection between the sleeve and the stud. A lateral port 84 extends from the chamber 83 through the sleeve 51 to the space between the sleeve and the bore 71 in the bracket so that lubricant from chamber 83 is admitted between the sleeve and the bracket to reach the thrust washers 55. In practice I provide a sealing ring 88 between the stud and the extension 65 of the sleeve to prevent escape of lubricant from between the stud and sleeve.

In employing the device of the present invention the sections X and Y are attached or secured to pipe sections or the like through the means 11 and 22. The desired plate end is introduced into the chamber of the plate carrier 12 and the threaded connections B are operated so that the section Y is forced toward the section X with the result that the clamp portion 23 of the section Y clamps the plate against the seat 18 in the plate carrier of section X. It will be apparent that by suitably operating the connections B the plate is made tight in the fitting and if the plate end is solid, as shown in Fig. 4, flow is positively cut off, whereas if an apertured plate end is employed flow is allowed to occur through the fitting. In either event the sealing means between the plate end and fitting sections prevents leakage from the fitting. When it is desired to remove the plate either to install a new or different plate or to change the plate end for end the connections B are operated to move the sections X and Y apart, with the result that the clamp portion 23 of section X moves away from the plate, freeing it so that it can be readily withdrawn from the plate carrier.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A structure coupling two relatively movable tubular sections including a plurality of circumferentially spaced connections between the sections operable to move the sections together or apart and each including a stud fixed to one section and projecting longitudinally of the sections and toward the other section, a lug projecting laterally from the other section and having a plain bore therethrough coaxial with the stud, a sleeve extending through the bore and threaded on the stud, the sleeve being freely rotatable in the bore, a head on one end of the sleeve at one side of the lug, and a collar on the other end of the sleeve at the other side of the lug.

2. A structure coupling two relatively movable tubular sections including a plurality of circumferentially spaced connections between the sections operable to move the sections together or apart and each including a stud fixed to one section and projecting longitudinally of the sections toward the other section, a lug projecting laterally from the other section and having a bore therethrough coaxial with the stud, a sleeve extending through the bore and threaded on the stud, a head on one end of the sleeve at one side of the lug, a collar on the other end of the sleeve at the other side of the lug, and thrust washers between the head and lug and between the collar and lug.

3. A structure coupling two relatively movable tubular sections including a plurality of circumferentially spaced connections between the sections operable to move the sections together or apart and each including a stud fixed to one section and projecting longitudinally of the sections toward the other section, a lug projecting laterally from the other section and having a bore therethrough coaxial with the stud, a sleeve extending through the bore and threaded on the stud, a head on one end of the sleeve at one side of the lug, a collar on the other end of the sleeve at the other side of the lug, and a snap ring retaining the collar on the sleeve.

4. A structure coupling two relatively movable tubular sections including a plurality of circumferentially spaced connections between the sections operable to move the sections together or apart and each including a stud fixed to one section and projecting longitudinally of the fitting toward the other section, a lug projecting laterally from the other section and having a bore therethrough coaxial with the stud, a sleeve extending through the bore and threaded on the stud, a head closing one end of the sleeve at one side of the lug, a collar on the other end of the sleeve at the other side of the lug, and means for introducing lubricant into the sleeve between the head and the end of the stud.

5. A structure coupling two relatively movable tubular sections including a plurality of circumferentially spaced connections between the sections operable to move the sections together or apart and each including, a stud fixed to one section and projecting longitudinally of the fitting toward the other section, a lug projecting laterally from the other section and having a bore therethrough coaxial with the stud, a sleeve extending through the bore and threaded on the stud, a head on one end of the sleeve at one side of the lug, a collar on the other end of the sleeve at the other side of the lug, thrust washers between the head and lug and between the collar and lug, and means for introducing lubricant into the sleeve between the head and the end of the stud and to the washers.

6. A connection coupling two relatively movable tubular sections including, a stud fixed to one section and projecting longitudinally of the sections and toward the other section, a lug projecting laterally from said other section and having a plain bore therethrough coaxial with the stud, a sleeve extending through the bore and threaded on the stud and being freely rotatable in the bore, and two elements on the sleeve at opposite sides of the lug, one of the elements being fixed on the sleeve and the other being detachable therefrom, one of said elements being a collar at one side of the lug and the other being a tool receiving head at the opposite side of the lug.

LELAND S. HAMER.

REFERENCES CITED

The following references are of record in the file of this patent:

UNITED STATES PATENTS

| Number | Name | Date |
|---|---|---|
| 1,889,133 | Pfefferle | Nov. 29, 1932 |
| 1,980,451 | Taylor | Nov. 13, 1934 |
| 2,339,970 | Young | Jan. 25, 1944 |
| 2,386,893 | Hamer | Oct. 16, 1945 |
| 2,425,934 | Hamer | Aug. 19, 1947 |